United States Patent [19]

Scheuneman

[11] 4,292,674
[45] Sep. 29, 1981

[54] ONE WORD BUFFER MEMORY SYSTEM

[75] Inventor: James H. Scheuneman, St. Paul, Minn.

[73] Assignee: Sperry Corporation, New York, N.Y.

[21] Appl. No.: 61,226

[22] Filed: Jul. 27, 1979

[51] Int. Cl.³ .............................. G06F 9/32; G11C 8/00
[52] U.S. Cl. .................................... 364/900; 364/200; 365/230
[58] Field of Search ... 364/200 MS File, 900 MS File; 371/38; 365/230, 239

[56] References Cited

U.S. PATENT DOCUMENTS

| | | | |
|---|---|---|---|
| 3,387,273 | 6/1968 | Carter et al. | 364/200 |
| 3,389,380 | 6/1968 | Ashbaugh et al. | 364/200 |
| 3,445,818 | 5/1969 | Yen | 364/200 |
| 3,533,077 | 10/1970 | Bell et al. | 364/200 |
| 3,559,183 | 1/1971 | Sussenguth | 364/200 |
| 3,654,622 | 4/1972 | Beausoleil | 364/900 |
| 3,755,779 | 8/1973 | Price | 371/38 |
| 3,775,756 | 11/1973 | Balser | 364/200 |
| 3,825,904 | 7/1974 | Burk et al. | 364/200 |
| 4,032,896 | 6/1977 | Bennett et al. | 364/200 |
| 4,040,030 | 8/1977 | Cassonnet | 364/200 |
| 4,040,031 | 8/1977 | Cassonnet | 364/200 |
| 4,080,648 | 3/1978 | Asano et al. | 364/200 |
| 4,095,269 | 6/1978 | Kawabe et al. | 364/200 |
| 4,095,278 | 6/1978 | Kihara | 364/900 |
| 4,156,905 | 5/1979 | Fassbender | 364/900 |
| 4,170,039 | 10/1979 | Beacom et al. | 364/200 |
| 4,173,041 | 10/1979 | Dvorak et al. | 364/200 |
| 4,197,589 | 4/1980 | Cornish et al. | 364/900 |

Primary Examiner—Charles E. Atkinson
Attorney, Agent, or Firm—Kenneth T. Grace; William E. Cleaver; Marshall M. Truex

[57] ABSTRACT

A memory system which already includes an address register, a randomly accessible memory unit, a data-in register and a data-out register is converted to also include a one word buffer memory with the addition of only a few components. A plus one adder is included for incrementing the address contained in the address register and the result is then stored in an address plus one register. The randomly accessible memory unit may be accessed with the address plus one register when it has completed the normal access with the address register pending a new request. The resultant memory data from this access at the incremented address is stored in a one word internal register which is a buffer to the randomly accessible memory unit. Since such access is noninterfering with and overlapped in time with the overall memory system communication with a requestor, and pending any new request to the randomly accessible memory stores, it serves to efficiently create a buffer store only for the next consecutive address. When a new request from a requestor external to the memory system occurs, a comparator compares the new address as becomes lodged in the address register and the immediately previously requested address as is still temporarily lodged in the address plus one register. If they match, meaning that the next consecutive address has been referenced, referenced memory data word will already be available in the one word internal buffer register. If they do not match, the randomly accessible memory unit must be accessed in the normal manner.

18 Claims, 4 Drawing Figures

ONE WORD BUFFER MEMORY SYSTEM

BACKGROUND OF THE INVENTION

The present invention relates generally to randomly accessible memory systems.

Memory systems operate in a generally serial fashion. That is, the memory system will handle a request for data from one particular address, operate upon that request, supply the requested data, and then turn and start the next request. Generally, the first request must be completed before the second request can be initiated. When the memory system is a large one, and is randomly accessible, the access time for a particular data word may be significant with respect to the overall operating system of which the memory system is a part.

Buffer memories have been developed which attempt to decrease the access time necessary for some data words requested. Generally, these buffer memory systems try to anticipate future requests for data words by providing a separate and faster buffer memory into which are stored selected data words which the memory system feels may be requested in the future. If such data words are requested, they will be available without the necessity of going to the main memory. Generally, the data words which are selected for storage in the buffer memory are tied in some fashion to the address of a normal memory request. For example, when one particular data word is requested from main memory, more than just that data word may be loaded into the buffer memory. Generally, this is accomplished on a page or block basis in which data words are grouped into pages or blocks and when one data word within that page or block is requested, then all of the data words within that page or block are loaded into the buffer memory and then are available for subsequent memory requests. When a subsequent request occurs to one of the other data words within the page or block, that data can be made available much quicker than if that data were not located in the buffer memory.

The basis for loading a page or block of data words into the buffer memory when one of the data words is requested from the memory system is based on the limited assumption that requests to the memory system will tend to be somewhat sequential in nature based on the general flow of a software program. If the flow is generally sequential, then the next data word following that data word which has been requested from the memory system will be the most likely candidate for future accesses. As buffer memories are increased in size and the data words which are loaded into the buffer memory become larger and larger, the benefit, or rather the likelihood that the next request will be a request for one of those data words, increases. But such increase is not in direct proportion to the number of data words being added to the buffer.

Buffer memories of present memory systems are somewhat expensive to construct. The buffer memory requires not only the randomly accessible memory unit in which the data words contained in the buffer memory are stored, but also includes an associative memory which is used to determine which data words are present in the buffer memory and for matching the address of a future request to those addresses of data words present in the buffer memory.

SUMMARY OF THE INVENTION

The one word buffer memory system of the present invention provides the advantage of low cost as would result from not having a buffer memory and the performance advantage of having a buffer memory.

Because of existing registers and components in a normal non-buffered memory system, a one word buffer memory can be implemented according to the present invention by adding only a plus one adder, an address register, a comparator and a selector.

The normal memory system normally includes an address register, a randomly accessible memory unit, a data-in register and a data-out register. The plus one adder is added by the present invention for incrementing the address contained in the address register. The result is then stored in a newly added address register, called the address-plus-one register. The randomly accessible memory unit will be sequentially accessed by the address-plus-one register when it has completed the normal access with the address register. When a new request occurs, a comparator compares the new contents of the address register and the address-plus-one register. If they match, the data will already be available from the sequential access following the previous normal access. If they do not match, the randomly accessible memory unit may be accessed in the normal manner. The selector is utilized for sequentially selecting between the address register and the address-plus-one register for the address input to the randomly accessible memory unit.

BRIEF DESCRIPTION OF THE DRAWINGS

Features of the present invention will become more readily apparent by having reference to the accompanying drawings in which.

DESCRIPTION OF THE PREFERRED EMBODIMENT

Figure 1:
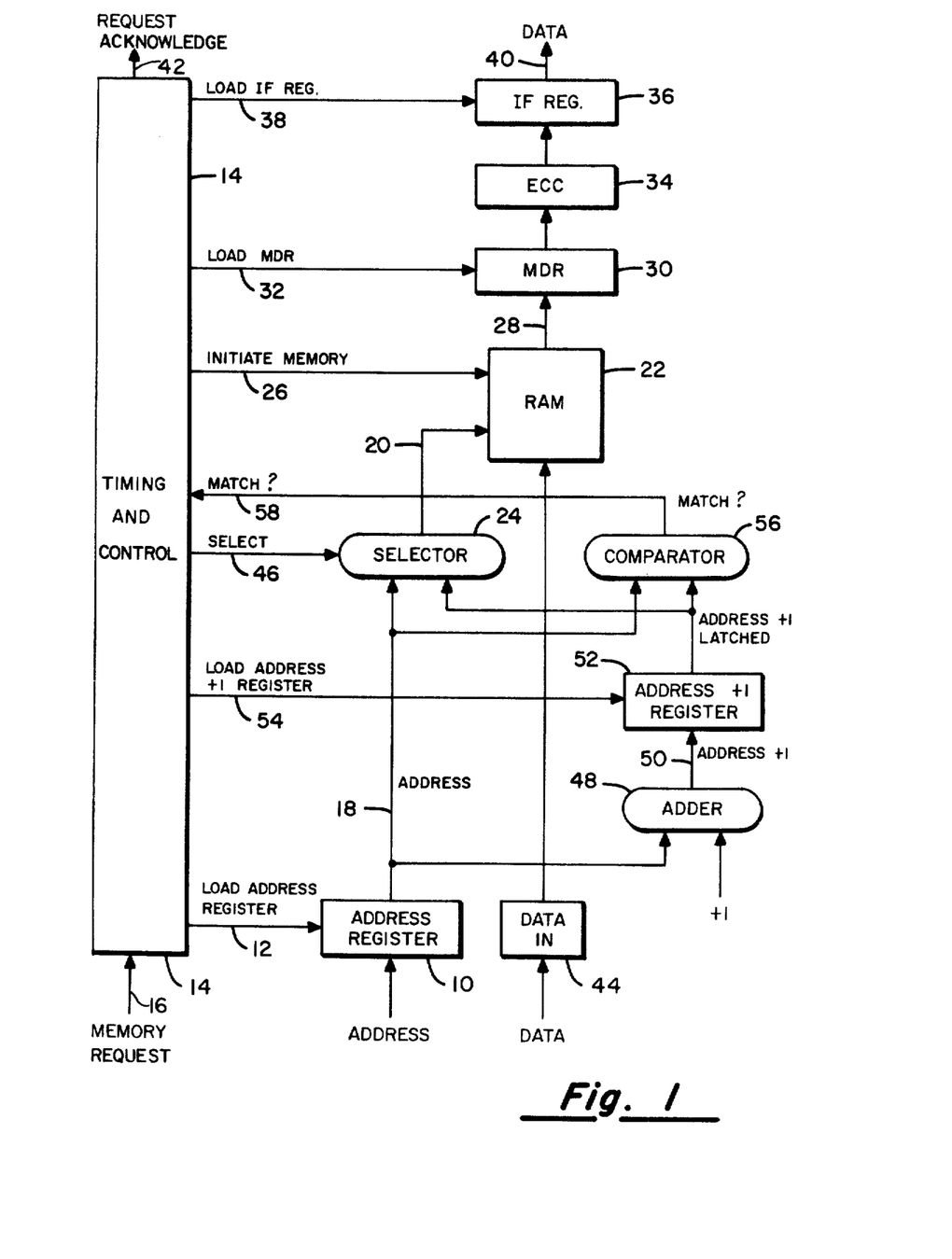
FIG. 1 is a schematic representation of the one word buffer memory system including components already existing in a present memory system.

FIG. 1 illustrates a schematic of the one word buffer memory of the present invention. Since the operation and construction of the one word buffer memory depends and relies upon existing components contained in an existing memory system, these components are also illustrated in the schematic diagram in FIG. 1. An address register 10 is provided for holding the address of the data word requested from the memory system by an external requestor. An example of a component, a common register circuit, which could be used for the address register 10 is a Motorola MC10175. This address is latched into the address register 10 by the load address register signal 12 coming from the timing and control circuitry 14 which is initiated by the memory request signal 16 which is transmitted by the external requestor.

The address from the address register 10 is then available on address signals 18 and 20 and will be directly or indirectly presented to the address input of the randomly accessible memory unit 22. An example of a cmponent, a RAM memory circuit, which could be used for the randomly accessible memory unit 22 is a Motorola MCM10146. Note that in the existing memory systems, the selector 24 is not present and address signals 18 are connected directly to address signals 20 which are in turn connected to the randomly accessible memory unit 22. The timing and control logic 14 sends an initiate memory signal 26 to the randomly accessible memory unit 22. The randomly accessible memory unit 22 then obtains the requested data word and transmits it along data lines 28 to a memory data register 30. An example of a component, a common register circuit, which could be used for the memory data register 30 is a Motorola MC10175. Memory data register 30 is latched by a load memory data register signal 32 supplied from the timing and control circuitry 14. At this point, the data contained in the memory data register 30 may be made available to the requestor directly or in the preferred embodiment of the memory system it may further be operated on by an error correction code apparatus which will detect and correct limited amounts of bit errors in the data obtained from the randomly accessible memory unit 22. This error correction circuitry is a standard part of some existing memory systems. An example of a component, an error correction circuit which could be used as the error correction circuitry is the Motorola MC10163 error detection-correction circuits. A discussion of such prior error correction circuitry may additionally be had by referencing *Motorola MECL Integrated Circuits* published by Motorola, Inc., in 1978 at pages 3-62 to 3-67. Thus, the data contained in memory address register 30 is supplied to the error correction circuitry 34 and after error correction is supplied to an interface register 36. An example of a component, a common register circuit, which could be used for the interface register 36 is a Motorola MC10175. The interface register 36 is latched by a load interface register signal 38. The output of the interface register 36 then represents the data 40 which is supplied to the external requestor along with a request acknowledge signal 42 supplied from timing and control circuitry 14. The existing memory system may also include a data in register 44 to which is supplied the data input from the external requestor and which supplies such data to the randomly accessible memory unit 22 for write operations. An example of a component, a common register circuit, which could be used for the data in register is a Motorola MC10175.

It can be seen from the operation of the memory system described in FIG. 1 that addresses from serial memory requests are loaded into address register 10 and the randomly accessible memory unit 22 is initiated. A delay occurs while the randomly accessible memory unit 22 obtains the particular data word and until it can be loaded into the memory data register 30. Another delay occurs while the error correction through the error correction circuitry 34 occurs and until the corrected data is available at the interface register 36. It is only at this point that a request acknowledge signal 42 may be sent to the external requestor and the data be made available along data lines 40. When a subsequent request occurs the same process is completed anew. The very same delays that occurred during the first operation are again present in the second operation.

The addition of a few components to the existing memory system thus far described can increase the performance of the memory system dramatically.

Again with reference to FIG. 1, the address from the address register 10 is made available on address signals 18 which is now supplied to one of the inputs of a two input selector 24 instead of directly to the address inputs of the randomly accessible memory unit 22. An example of a cmponent, a common selector circuit, which could be used for the selector 24 is a Motorola MC10158. The selector is controlled by select signal 46 supplied from timing and control circuitry 14. The output of the selector 24 is then supplied to address lines 20 which are connected to the address inputs of the randomly accessible memory unit 22. During the normal request operation, the select signal 46 wll select the address lines 18 to pass through and be present on address lines 20. This is the normal access mode of the memory system.

The address from the address register 10 along address lines 18 is also made available to an adder 48. This is one input to adder 48 since the sole function of the adder 48 is to add one to the address present on address lines 18. The other input of a two input adder, such as adder 48, is hardwired to a plus one. An example of a component, a common ader, which could be used for the adder 48 is a Motorola MC10180. Present on lines 50 after a short delay through adder 48 is the result of the contents of the address register 10 plus one. This incremented address present on lines 50 is then loaded into an address plus one register 52. An example of a component, a common register, which could be used for address plus one register 52 is a Motorola MC10175. Address plus one register 52 is latched by a load address plus one register signal 54 supplied by a timing and control circuitry 14. The output of address plus one register 52 is supplied to the second input of selector 24. As soon as the randomly accessible memory unit 22 is done with the address from address register 10 on a normal memory request, the timing and control circuitry 14 will change select line 46 and present the address from address plus one register 52 through selector 24 and address lines 20 to the address input of the randomly accessible memory unit 22. While the data word previously obtained from the address supplied by address register 10 is being moved through the error correction circuitry 34 to the interface register 36, the timing and control circuitry 14 will initiate the randomly accessible memory unit 22 by sending the randomly accessible memory unit 22 an initiate memory signal 26 which will cause a data word at the address contained in the address plus one register to be supplied memory data register 30. The contents of the address plus one register 52 are also supplied to a comparator 56. An example of a component, a comparator, which could be used for the comparator 56 is a Motorola MC10166. The comparator's other input is supplied from address lines 18. When a next or second request is received by the memory system and the associated new address is loaded into address register 10, the comparator 56 will compare the new, second, address as supplied by address lines 18 with the previous address plus one register 52 first address which was previously supplied to the comparator 56. If the comparator 56 finds that a match has occurred, it means that the second requested address is exactly one more than the first requested address. In that case, the randomly accessible memory unit 22 has already been accessed and that data is presently located in memory data register 30. Thus, the comparator 56 sends a match signal 58 to timing and control circuitry 14 which then does not initiate the randomly accessible memory 22 with a new initiate memory signal 26, but instead sends the data from memory data register 30 through the error correction circuitry 34 into the interface register 36 which supplies that data to the external requestor along data lines 40.

If the comparator 56 determines that the addresses contained in address register 10 and address plus one register 52 do not match, it sends the appropriate signal to timing and control circuitry 14 which then selects address lines 18 to pass through selector 24 to address lines 20 and sends an initiate memory signal 26 to the randomly accessible memory unit 22. The word at the new address is then obtained and presented to memory data register 30 where again it is supplied through the error correction circuitry 34 to the interface register 36 and made available to the external requestor along data lines 40.

Figure 2:
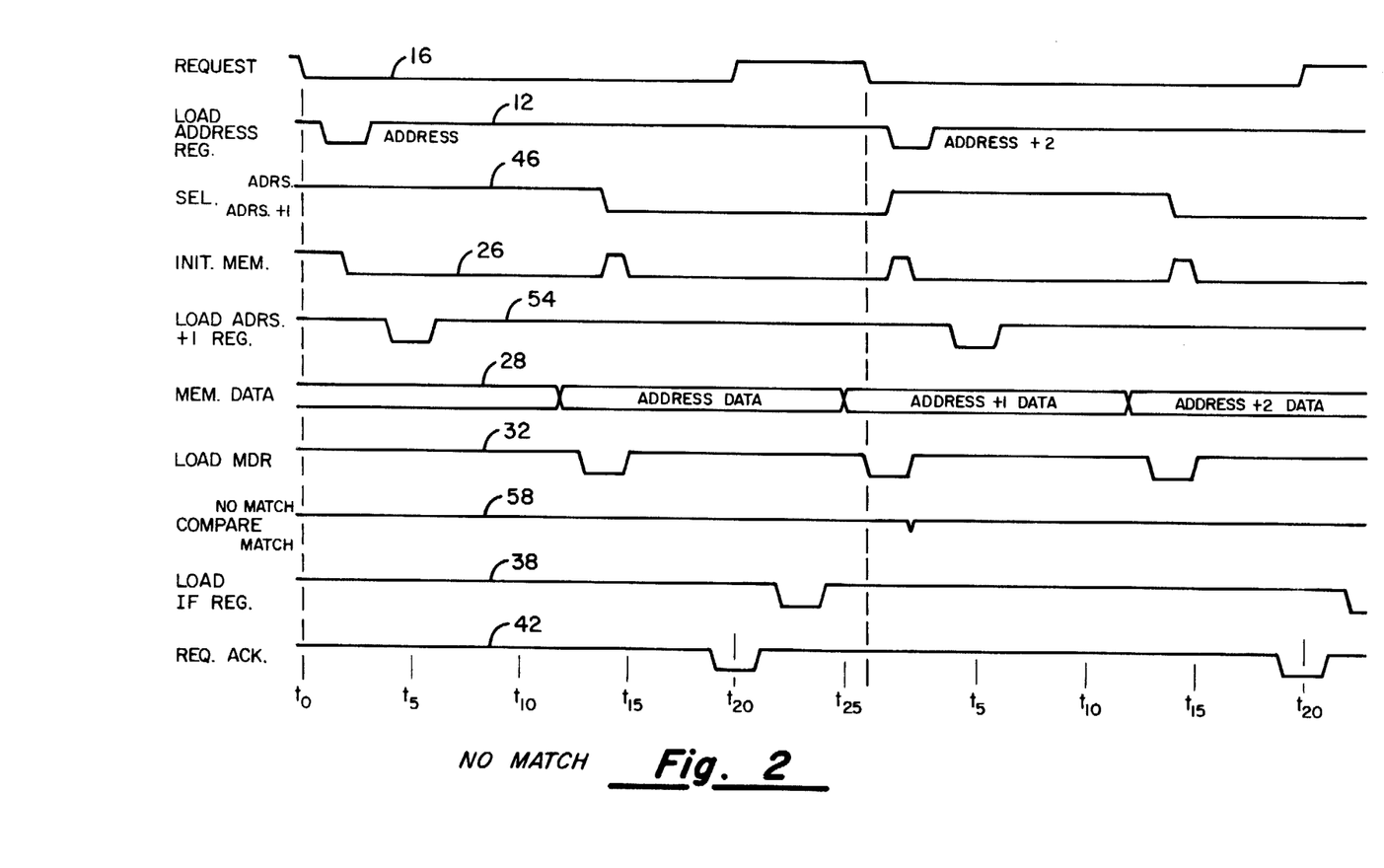
FIG. 2 is a timing diagram of the one word buffer memory system illustrated in FIG. 1 when sequential requests to the memory system are not for sequential data words therein.
Figure 3:
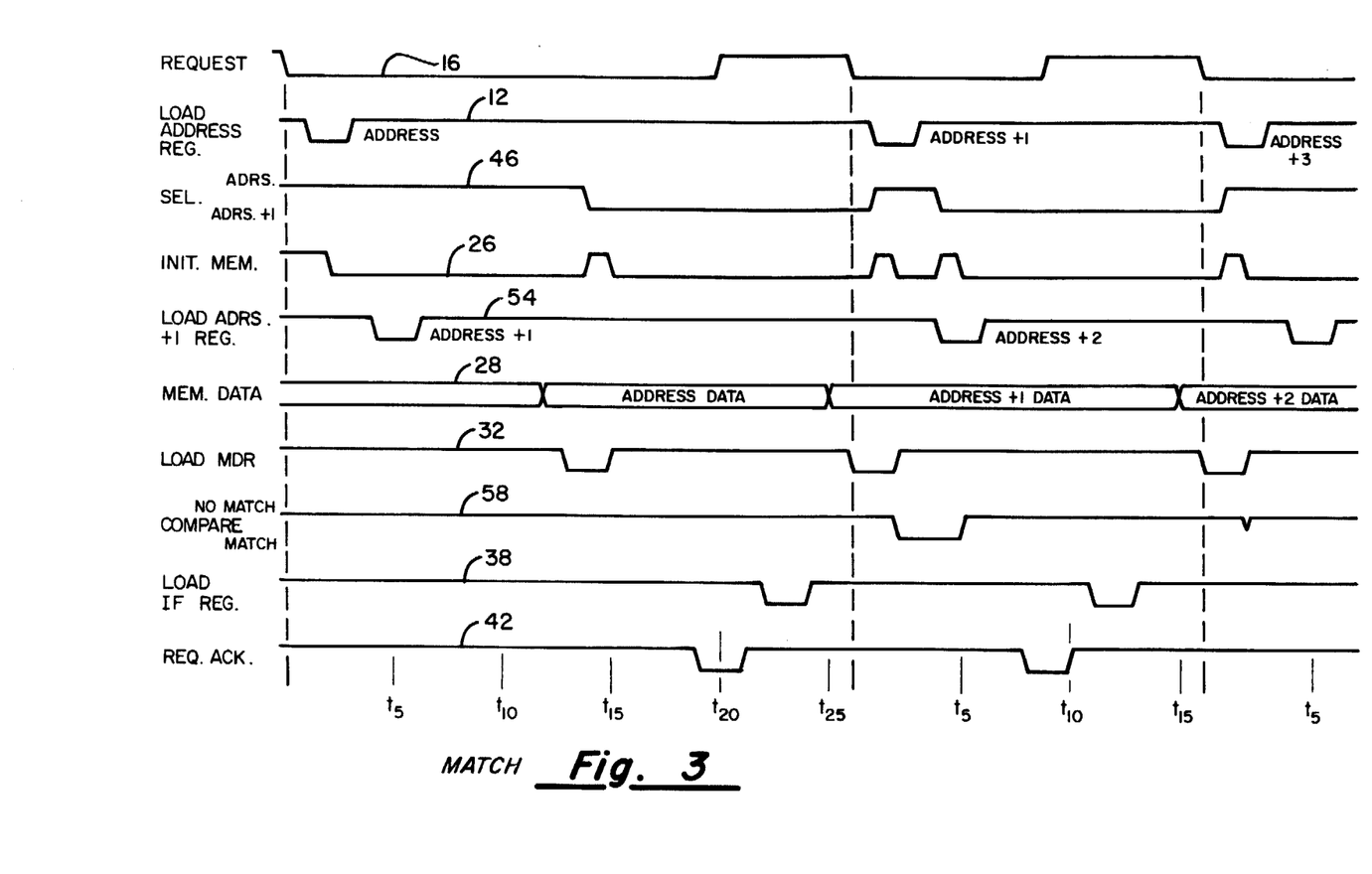
FIG. 3 is a timing diagram of the one word buffer memory system of FIG. 1 when sequential requests to the memory system are to sequential data words contained therein.

FIG. 1 has illustrated the connection of the major components of both the existing memory system and the interconnection of the components added to the existing memory system to form the one word buffer memory system of the present invention. The discussion of FIG. 1 has also included illustrative comments relative to the sequencing of events occurring within the schematic of FIG. 1. Reference to FIG. 2 and FIG. 3 will illustrate in detail the exact sequencing and occurrence of events during the operation of the one word buffer memory system in both the case in which consecutive memory requests are to consecutive sequential addresses (FIG. 3) and the case in which consecutive memory requests are not to consecutive sequential addresses (FIG. 2).

Illustrated in FIG. 2 is a detailed timing diagram showing all of the signals which enter and leave the timing and control circuitry 14 located in FIG. 1. The exact signals and timing of the signals illustrated in FIG. 2 provide both a basic understanding of the sequence of events occurring within the one word buffer memory system and enable one of ordinary skill in the art to construct an appropriate timing and control mechanism 14 for implementing the one word buffer memory system. Memory request signals 16 supplied by the external requester initiates the timing and control cycle. The load address register signal 12 is supplied immediately upon receipt of the memory request signal 16. The select signal 46 is initially set to select the address register and will later in the cycle switch to select the address plus one register as soon as the randomly accessible memory unit 22 is done with the access requiring the address register 10. Soon after the address is latched into the address register 10 by the load address register signal 12, the initiate memory signal 26 is activated by sending it low and it remains activated until the randomly accessible memory unit supplies stable data indicated by data signals 28. The load memory data register signal 32 is then activated following the stabilization of data signals 28. As soon as the memory data register 30 is loaded by load memory data register signal 32, the initiate memory signal 26 is deactivated, the select signal 46 is switched to select the address plus one register and the initiate memory signal 26 is again activated to obtain the data located at address plus one. In the meantime, the data from the address contained in memory data register 30 is sent through error correction circuitry 34 and when that is complete, the interface register 36 is loaded by activation of load interface register signal 38. As soon as the load interface register signal 38 is activated, or in this case slightly before, due to known transmission delays, a request acknowledge signal 42 may be sent to the external requestor. At that point, the external requestor then deactivates memory request signal 16. While the data from the location address contained in the interface register 36 is being sent to the external requestor, as soon as the data lines 28 become the memory data register 30 is available. As soon as data lines 28 become stable, at time $T_{25}$, from the second initiate memory signal 26 activation, then data from address plus one is loaded into the memory data register 30 by another activation of load memory data register signal 32. The external requestor may at some time subsequent then send a second memory request 16 signal. Again the load address register signal 12 is activated and the select signal 46 again selects address register. As soon as the address register is selected, initiate memory signal 26 is again activated to obtain the data word from the randomly accessible memory 22. If this subsequent, second, memory request is not for the next consecutive address then the match signal 58 indicates that there is no match between this new, second, address contained in address register 10 and the previous, first, address now incremented and contained in address plus one register 52. This indicates that the data previously obtained and stored in the memory data register 30 is not the requested data and new data must be obtained from the randomly accessible memory. The remainder of the signals then in the second portion of FIG. 2 are then repeats of the first cycle. Again, the address plus one register 52 is loaded with the incremented address from address register 10 and data at this incremented address is then made available for the next cycle by being temporarily stored in memory data register 30.

FIG. 3 represents the same signals discussed in FIG. 2, but illustrates the exact timing and sequencing when the second address loaded into address register 10 is the consecutive sequential address to the first address loaded into address register 10. In FIG. 3 the first set of timing signals from $T_0$ through $T_{25}$ are exact duplicates of the cycle described in FIG. 2. After $T_{25}$, however, the sequence and timing of the signals changes to take advantage of the prefetched word contained in the memory data register which is effectively now a one word buffer. Here in FIG. 3 memory request signal 16 goes low and will not again be reactivated until after activated time $T_{25}$ following the completion of the first memory cycle. During a second, subsequent, memory cycle load address register signal 12 is activated to latch the new address into the address register 10. Select signal 46 is set to select address register 10 and the initiate memory signal 26 is again activated to request that address from the randomly accessible memory unit 22. Operations to this point are identical to the operation contained in FIG. 2. However, now the new, second, address latched in address register 10 and the previous first address now incremented and contained in address plus one register 52 are identical since the second request is for the next consecutive sequential address. Match signal 58 goes low indicating that a match has occurred. The timing and control circuitry 14 then immediately cancels the initiate memory signal 26 which has the effect of canceling any memory operation occurring within the randomly accessible memory unit 22. Since match signal 58 indicates that a match has occurred, we know that the proper data is already loaded into the memory data register 30 and that data is immediately sent through the error correction circuitry 34 and is loaded into the interface register 36 by load interface register signal 38 and a prompt request acknowledge signal 42 is sent to the external requestor. Note that this has all occurred and the request acknowledge signal 42 has been sent, in this instant, before $T_{10}$ whereas in a normal non-match cycle, as in FIG. 2, the request acknowledge signal 42 is not sent until $T_{20}$. This represents a sizable and significant increase in speed of the overall memory system. Also in the second cycle described in FIG. 3, note that once the match has occurred and the data previously obtained is loaded into the interface register 36 with load interface register signal 38, then the entire fetch of the data at still the next consecutive address transpires. The address loaded into address register 10 is again incremented and loaded into address plus one register 52 by load address plus one register signal 54. The memory is again initiated by initiate memory signal 26 not to obtain the data word from the current request, but again to prefetch the next sequential data word in case the next request and the next address loaded into address register 10 is also sequential. This data once obtained and stable at approximately time $T_{15}$ on the second cycle, is loaded into the memory data register 30 by load memory data register signal 32 and again a new cycle or sequence of events can occur upon a request to memory through memory request signal 16.

From reference to the circuit diagram in FIG. 1 and the two extensive and complete timing charts in FIGS. 2 and 3, it should now be readily apparent how the operation of the one word buffer memory system operates and the time advantage obtained therefrom. Note that the only components added to the existing memory system include the adder 48, the address plus one register 52, the comparator 56 and the selector 24. All other components already existed in the initial memory system which did not contain the one word buffer.

Figure 4:
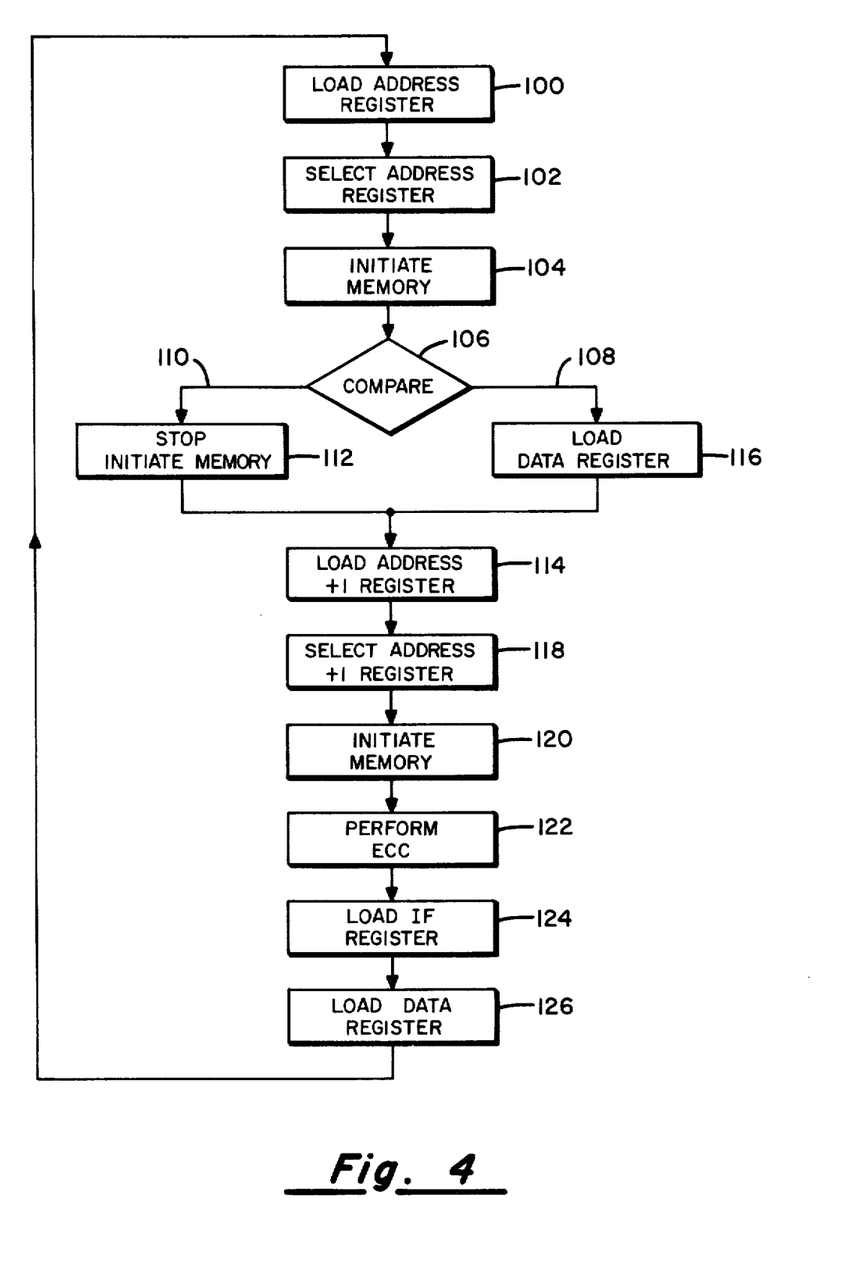
FIG. 4 is a flow chart illustrating the sequencing of events of the one word buffer memory system illustrated in FIG. 1.

The overall sequence of events may now be described by having reference to the flowchart contained in FIG. 4. In the flowchart, the first memory cycle is initiated by the external requestor and the address register 10 is loaded with the requestor's first address as step 100. The selector 24 is changed to select the address register 10 to be applied to the randomly accessible memory 22 as step 102. The randomly accessible memory 22 is initiated to obtain the data at that address as step 104. Since there may have been a previous cycle in which the next sequential address from a previous request has been prefetched, a comparison in comparator 56 is now made between the present address loaded in the address register 10 and the incremented address from the previous request as located in address plus one register 52 and a determination is made as to whether those addresses match in step or do not match 106. If the addresses match, this indicates that that data has already been prefetched and is presently loaded into the memory data register 30. This is indicated on the flowchart by following the path 110 from the compare step 106. Since the data desired is already in the memory data register 30, the randomly accessible memory unit 22 is now stopped by canceling the initiate memory signal 26 in step 112. If the compare step 106 indicates that there is no match, this indicates that the data contained in the memory data register 30 is not the proper data and hence, the memory cycle initiated at step 104 for the present data must be completed. This is indicated by following the path 108 on the flow diagram and loading the memory data register 30 with the proper data in step 116. Since the proper data is now contained in the memory data register 30 at this point for both cases whether there was a match or whether there was a non-match, the two paths now merge and the address plus one register 52 is loaded in step 114 and the selector 24 is moved to select the address plus one register 52 in step 118. The randomly accessible memory unit 22 is initiated in step 120 to prefetch the next sequential data word should it be requested. Error correction in the error correction circuitry 34 is accomplished on the previously obtained data which has been resident in the memory data register in step 122. As soon as the error correction has taken place, the data for the present cycle is loaded into the interface register 36 as step 124. Once the data of the present cycle has been loaded into the interface register 36, the prefetched data for the next cycle may be loaded into the memory data register 30 in step 126. At this point, the external requestor may then begin a new cycle by supplying a new address and the flowchart moves back to step 100 where the address register 10 is again loaded and the entire cycle is again repeated. Note that the cycles are very similar whether or not a match occurs during the compare at step 106. If the compare does indicate a match, notice that the only action taken which is different is to stop the memory initiate from the initiate step 104 since the desired data has already been loaded into the memory data register 30 during step 126 on the previous cycle. If a match is not indicated at step 106, then, of course, the randomly accessible memory 22 must be allowed to complete its fetch and when that data is available, it is loaded into the memory data register 30 at step 116. At this point the sequence again becomes common. While there is not a lot of difference in the flowchart, it must be emphasized that there is a great deal of difference in terms of the time required to perform both paths. In terms of the match following path 110, the memory cycle is simply stopped and this takes only a very short period of time. If there is no match and path 108 must be followed, then the randomly accessible memory unit 22 must be allowed to complete its normal access cycle. This can and does take a substantial portion of time and it is exactly this time that the one word buffer memory of the present invention is saving.

Thus, it can be seen that there has been shown and described a novel one word buffer memory. It is to be understood, however, that various changes, modifications, and substitutions in the form of details of the described memory system can be made by those skilled in the art without departing from the scope of the invention as defined by the following claims.

What is claimed is:

1. A memory system for storing a plurality of data words at addressable locations therein, comprising:
    a first address register for sequentially holding a succession of reference addresses of ones of said plurality of data words;
    adder means coupled to said first address register for respectively sequentially incrementing each and every reference address of one of said plurality of said data words and providing a result of said first address plus one;
    a second address register coupled to said result of said adder means for holding one plus said reference address of one of said plurality of data words;
    comparison means coupled to said first address register and to said second address register for comparing a second reference address when sequentially subsequently lodged in said first address register with a first reference address plus one as lodged in said second address register and providing a match output when the comparison agrees;

selector means having two inputs selectively coupled to said first address register and to said second address register and providing an output of either of said two inputs and capable of switching between said two inputs;

a randomly accessible memory having an address input coupled to said output of said selector means for storing said plurality of data words therein and having an output of one of said plurality of said data words whose address is present on said address input;

a data register coupled to said output of said randomly accessible memory for holding said one of said plurality of said data words addressed; and an interface register coupled to said data register and communicative for data transfer to an external requestor of said memory system;

sequence control means for, selectively upon the lack of a match output from said comparison means firstly causing said first address when and as firstly held in said first address register to be firstly selectively coupled through said selector means to said randomly accessible memory as will cause addressed data at said first address to become firstly collectively lodged in said data register and transferred to said interface register and output to said requestor, alternatively selectively upon the existence of a match output from said comparison means firstly causing the contents of said data register to be transferred to said interface register and output to said requestor, and always secondly causing said incremented first address from said second address register to be secondly selectively coupled through said selector means to said randomly accessible memory as will cause addressed data at said incremented first address to become secondly lodged in said data register;

whereby a second data word may be sequentially accessed from said memory system utilizing the prefetched data word as has during a prior first access become secondly lodged in said data register when said address of said second data word is one more than the address of a first data word already accessed from said memory system.

2. A memory system as in claim 1 which further comprises:

error correction means intermediately connectively located between said data register and said interface register for performing error correction upon each of said plurality of said data words as respectively sequentially gated from said data register to said interface register.

3. A memory system as in claim 2 where said adder means is a binary plus one adder.

4. A memory system as in claim 3 where said comparison means is a binary comparator.

5. A memory system as in claim 4 where said selector means is a binary two-input selector.

6. In a memory system for storing a plurality of data words at addressable locations therein and of the type having a first address register for sequentially holding a succession of reference addresses of ones of said plurality of data words, a randomly accessible memory having an address input directly or indirectly received from said first address register and for storing said plurality of data words therein and having an output of one of said plurality of data words whose address is present on said address input and a data register coupled to said output of said randomly accessible memory for holding said one of said plurality of said data words addressed, the improvement comprising:

adder means coupled to said first address register for respectively sequentially incrementing each and every reference address of one of said plurality of said data words and providing a result of said reference address plus one;

a second address register coupled to said result of said adder means for holding one plus said reference address of one of said plurality of data words;

comparison means coupled to said first address register and to said second address register for comparing a second reference address when sequentially subsequently lodged in said first address register with a first reference address plus one as lodged in said second address register and providing a match output when the comparison agrees;

selector means having two inputs selectively coupled to said first address register and to said second address register and providing an output of either of said two inputs and capable of switching between said two inputs where said address input of said randomly accessible memory is coupled to said output of said selector means instead of directly to said first address register; and control sequencing means which will selectively only if said comparison means do not provide a match output firstly cause said selector means to gate said second reference address when lodged in said first address register to said randomly accessible memory and will not so cause gating of said second reference address when lodged in said first address register if a match output is provided by said comparison means, and will furthermore always secondly cause said selector means to gate said second reference address plus one as contained in said second address register to said randomly accessible memory; and whereby it may be seen that said randomly accessible memory will be firstly referenced for a second, subsequent sequential, address only if said second, subsequent sequential, address is not the most consecutive address from a first, immediately prior address reference but also that said randomly accessible memory will always be secondly referenced at such second, subsequent sequential, address plus one.

7. A memory system as in claim 6 which further comprises:

error correction means coupled to said data register for performing error correction upon each of said plurality of said data words as respectively sequentially gated from said data register; and an interface register coupled to said error correction means for respectively sequentially holding each of said plurality of said data words after error correction.

8. A memory system as in claim 7 where said adder means is a binary plus one adder.

9. A memory system as in claim 8 where said comparison means is a binary comparator.

10. A memory system as in claim 9 where said selector means is a binary two-input selector.

11. A memory system for storing a plurality of data words at addressable locations therein of the type which is capable of accessing two of said data words at one rate when said two of said data words are located at two of said addressable locations therein which are not consecutive and is capable of accessing two of said data words at a second rate when said two of said data words are located at two of said addressable locations therein which are consecutive and where said second rate is greater than said first rate, comprising;
- a first address register for sequentially holding a first address of the first of said two data words and then holding a second address of the second of said two data words;
- adder means coupled to said first address register for incrementing said first address of said first of said two data words and providing an output of said first address plus one;
- a second address register coupled to the output of said adder means for holding one plus said first address of said first of said two data words;
- comparison means coupled to said first address register and to said second address register for comparing said second address of said second of said two data words from said first address register with one plus said first address of said first of said two data words from said second address register and providing a match output when the comparison agrees;
- selector means having two inputs selectively coupled to said first address register and to said second address register and providing a single output of either said two inputs and capable of switching between said two inputs;
- a randomly accessible memory for storing a plurality of data words therein and having an output of one of said data words when supplied with the address of said one of said data words, said randomly accessible memory coupled to said single output of said selector means;
- a data register coupled to said output of said randomly accessible memory for sequentially holding each of said two data words at subsequent instants of time; and
- control means coupled to said match output and coupled to said selector means for selecting said first address of said first of said two data words as contained in said first register during a first half of said memory system's cycle to cause first address data to be accessed from said randomly accessible memory to said data register and for selecting one plus said first address as contained in said second register during a second half of said memory system's cycle to cause one plus said first address data to be accessed from said randomly accessible memory to said data register;
- whereby said second of said two data words may be said to be prefetched to the data register when a second memory cycle to address said second of said two data words at said second address is subsequently made when said first and second addresses are consecutive 12. A memory system as in claim 11 which further comprises:
- error correction means coupled to said data register for performing error correction upon each of said two data words as they are respectively sequentially gated from said data register; and
- an interface register coupled to said error correction means for respectively sequentially holding said first of said two data words and said second of said two data words at subsequent instants of time and after error correction;
- whereby, at one instant of time, said interface register may hold said first of said two data words and said data register may hold said second of said two data words.

13. A memory system as in claim 12 where said adder means is a binary plus one adder.

14. A memory system as in claim 13 where said comparison means is a binary comparator.

15. A memory system as in claim 14 where said selector means is a binary two-input selector.

16. In a memory system containing both random access memory storage means and requestor interfacing means and which spends finite sequential times in the functions associated with each, an improvement in performance during sequential requestor references to consecutive addressable locations which comprises:
- internal buffer register means for hlding one word of accessed memory storage means data;
- sequencing means always enabled for filling said internal buffer register means with said data fetched from one address greater than that address currently referenced of said memory system substantially during such time as said memory system is engaged in requestor interfacing like as occurs upon issuance of data, whereby it may be said that such fetch of memory data is overlapped in time with requestor communication;
- address storage and comparison means for determining if each sequential requestor reference is to a consecutive addressable location from the immediately prior requestor reference; and
- control means discriminating upon the result of said address storage and comparison means for moving to issuance to an external requestor the prefetched memory data as is contained in said internal buffer register means if a consecutive addressable location is being sequentially referenced, but otherwise allowing a full de novo memory access at the referenced address for such memory data as is moved to issuance to the external requestor.

17. In an independently timed and controlled computer memory system which in each of successive read references receives from a requestor an address into address register means, fetches an associated one of a plurality of randomly addressable storage cells within memory storage means, and outputs to the requestor the referenced data through interface register means, an improvement to performance upon successively sequentially referencing consecutive addressable locations wherein said improvement comprises:
- internal one word buffer register means logically connectively intermediately located between said memory storage means and said interface register means;
- adder means connected to said address register means for incrementing by one the address received during each of said references;
- register storage means for receiving at an intermediate time during each of said references said incremented address from said adder means and storing it until an intermediate time during the next successive reference;

control sequencing and gating means for effecting a fetch to said memory storage means at said incremented address as stored in said register storage means and lodging the associated data within said internal buffer register noninterferentially and substantially during the time as said referenced data at said received address is being output to said requestor through said interface register;

comparator means for determining whether each of said received addresses as received into said address register during a requestor reference matches said incremented address of the previous reference as stored in said register storage means; and control discrimination means for causing said fetched data as is lodged in said internal buffer register to be transferred to said interface register means if a match is determined by said comparator elsewise causing a fetch to said memory storage means at said received address.

18. An improvement to the process of sequencing the information retrievel operation and the information issuance to requestor operation within an independently timed and controlled random access addressable memory which spends finite time on both operations which comprises:

overlapping in time the two operations of information retrieval and information issuance so that during all times that information at any set address is being issued to a communicating requestor a noninterferring simultaneous information retrieval operation substantially transpires which delivers up the contents of the next consecutive address to said set address as an internally held data product; and discriminating amongst successive sequential references to memory so that each and any reference to a next consecutive address from the immediately priorly referenced address will cause said already accessed internally held data product to be immediately gated for issuance as the desired addressed data, and so that each and any successive sequential reference not to the next consecutive address from the immediately priorly referenced address will cause said information retrievel operation to transpire before said information issuance operation.

* * * * *